United States Patent [19]

Burton

[11] 4,374,459
[45] Feb. 22, 1983

[54] CLASSIFICATION INSTRUMENT

[75] Inventor: Clark R. Burton, Los Altos, Calif.

[73] Assignee: Compair, Inc., Burlingame, Calif.

[21] Appl. No.: 133,949

[22] Filed: Mar. 25, 1980

[51] Int. Cl.³ .............................. G01B 5/20; G01B 7/28
[52] U.S. Cl. .................................................. 33/174 C
[58] Field of Search ............ 33/174 R, 174 C, 174 L, 33/174 P, 174 PA

[56] References Cited

U.S. PATENT DOCUMENTS

| | | | |
|---|---|---|---|
| 3,102,344 | 9/1963 | Herman | 33/174 PA |
| 3,464,119 | 9/1969 | Griggs | 33/174 C |
| 3,678,585 | 7/1972 | Dabrush | 33/174 P |
| 3,832,784 | 9/1974 | Samuels | 33/174 C |
| 3,959,886 | 6/1976 | Griggs | 33/174 C |
| 4,222,172 | 9/1980 | Mason | 33/174 C |

OTHER PUBLICATIONS

"The inspection of Turbine & Compressor Blades"–Sigma-Instrument Co.,12/11/58.
Aircraft Production, "High Speed Blade Checking" Mar. 1950, pp. 73-75.

Primary Examiner—Harry N. Haroian
Attorney, Agent, or Firm—Robert Charles Hill

[57] ABSTRACT

A classification instrument adapted for accurately measuring both blocked and open flow area for airfoil or vane elements such as turbine stator vanes having mounting buttresses at each end includes stops for mounting the vane element upon the instrument in a predetermined position established by a plurality of datum points or lines corresponding to the various stops, a plurality of indicators for measuring various points and surfaces upon the vane and providing classification readings from which the open and closed area values for the vane may be determined. A method is also disclosed for classifying or determining the blocked and open areas for such air foil or vane elements.

18 Claims, 9 Drawing Figures

CLASSIFICATION INSTRUMENT

BACKGROUND OF THE INVENTION

The present invention relates to a classification instrument for classifying airfoil or vane elements such as turbine stator vanes and the like. More particularly, the invention relates to a classification instrument capable of classifying or determining both the blocked area and open flow area for the airfoil or vane elements.

A number of classification gauges have been developed in the past in order to provide an accurate determination of the relative effective open area in the various stages of turbojet engines and the like. Such classification gauges have been particularly directed toward the classification or determination of such values in connection with individual vane elements or vane clusters including a plurality of guide vanes, turbine blades and/or other similar structures. For example, U.S. Pat. No. 3,464,119 issued Sept. 2, 1969 to Elmer L. Griggs, past president of assignee, disclosed a precision classification gauge for classifying individual guide vanes or the like for turbojet engines in order to facilitate assembly of various stages of the engine according to predetermined values for the effective open areas of the individual vanes. U.S. Pat. No. 3,959,886, issued June 1, 1976 also to Elmer L. Griggs, disclosed a similar classification gauge adapted for classifying or determining the relative effective open area for vane clusters rather than individual vane elements. U.S. Pat. No. 4,024,646 issued May 24, 1977, also issued to Mr. Griggs, disclosed yet another apparatus for simultaneously gauging and aligning movable elements of guide vane assemblies including a plurality of vanes or airfoil elements in order to both classify and adjust the effective open area for the vane assembly.

Substantial background information is set forth by the above-noted patents, particularly the first noted patent and reference may be had to those patents for a more complete understanding of certain aspects of the present invention. Generally, it has been found important to obtain the precise classification or determination of the effective open area for individual guide vanes or for adjacent guide vanes in a cluster or assembly. This value is commonly referred to as "throat area" and must be precisely established for various stages in machinery such as turbojet engines in order to permit proper performance.

The classification gauges disclosed by the above-noted patents have been found to be particularly suitable for determining the proper classification of individual guide vanes, vane clusters and even complete arrays of vanes or similar structures. Generally, the above-noted classification gauges function to accurately position within a precision jig one portion of an airfoil, such as its trailing edge, other portions of the airfoil then being precisely measured in order to classify the effective open area for the individual vanes or vane assemblies. Very generally, the open area for such vanes or vane assemblies may be determined by accurately monitoring the location of the trailing edge for the vane as well as its convex airfoil surface and the effective length of the vane or vane assemblies.

However, it has been found that an even greater amount of information concerning the vane structure is necessary in order to completely assess or preclassify the vane for use in a vane cluster or assembly. Preferably, it is important to know both the blocked area provided by each vane as well as the open or flow area provided by the individual vane either alone (defined herein as "effective open area") or in combination with an adjacent vane structure (defined herein as "open flow area"). In this regard, the term "blocked area" is employed herein to refer to the effective thickness of the vane or airfoil element multiplied by the effective length of the vane. The length of the vane is of course determined by the spacing between the buttresses or flanges arranged at the end of each vane.

Similarly, the open flow area is established as the effective opening width between a pair of adjacent vanes multiplied by the effective length for the opening between the vanes. Here again, the length of the opening between the vanes is also determined by the spacing between the buttresses for the two adjacent vane elements. Finally, in connection with the open flow area, it may be seen that the arrangement of each vane upon its buttresses contributes to the open flow area between the two adjacent vanes. Thus, in order to accurately assess each individual vane element, it is necessary to know the effective open area provided by the individual vane regardless of the vane structure to which it will be adjacent in a given assembly. Given the information outlined above, more accurate classification of the individual vane elements is possible in order to even more accurately assess its contribution within a given vane assembly.

Further, it has been realized in connection with the present invention that the traditional values of such a vane element including the locations of its trailing edge, convex airfoil surface, etc., are important in determining the values for blocked and open flow area as discussed above. In addition, it has been determined that other factors including particularly airfoil rotation, airfoil displacement and airfoil twist may further affect these area values. In this regard, airfoil rotation refers to the angular relationship between the airfoil vane element and its respective buttresses or flanges. Rotation of the airfoil in either a clockwise or counterclockwise direction upon the supporting buttresses will result in modification for both the blocked and open flow area values. Similarly, airfoil displacement refers to the location of the airfoil or vane elements upon its respective buttresses. Airfoil displacement is particularly concerned with relative positioning of the airfoil or vane elements upon their respective buttresses in a direction perpendicular to the path of airflow past or through the individual vanes or vane assemblies. Finally, airfoil twist refers to relative rotation between opposite ends of the individual airfoil or vane elements. Relative rotation may arise for example during manufacturing of the vane element with buttresses formed at opposite ends of the vane or airfoil. More commonly, such relative rotation may be produced between the opposite ends of an individual vane element when its buttresses are secured in a vane assembly such as in a given stage of a turbojet engine. For example, if the base surface of the opposite buttresses are not precisely aligned, or if the surfaces to which the buttresses are attached are not properly aligned, twisting or relative rotation between the opposite ends of the vane element may be produced by the high temperatures and forces within the engine. Accordingly, the present invention contemplates consideration of the above factors in order to more precisely classify the individual vane elements.

SUMMARY OF THE INVENTION

It is accordingly an object of the present invention to provide a classification instrument suitable for measuring or classifying both the blocked and the open flow areas of a vane or airfoil element.

More specifically, it is an object of the invention to provide such a classification instrument including means for accurately positioning the buttresses or flanges of the vane element in accurate alignment upon the instrument according to selected datum points or lines and thereafter carrying out selected measurements in order to accurately determine both the blocked area and/or open flow area for the vane element.

It is an even more particular object of the invention to provide a classification instrument and a method of classification wherein the buttresses or flanges of a vane or airfoil element are positioned according to a preselected number of datum points or lines, other surfaces or points upon the vane element thereafter being measured relative to the datum or reference points and lines in order to accurately classify or determine both the blocked area and open flow area for the individual vane element or the individual vane element in an assembly with an adjacent vane element.

More specifically, the present invention contemplates such an instrument and a method of operation wherein a number of indicators are employed to measure the various surfaces or points upon the vane element. The various datum points or lines used for initially positioning the vane element are set forth below together with a summary of the various measurements taken for each vane element by the individual indicators.

It will be apparent that various combinations of readings taken from these indicators may be employed for determining various values of the individual vane element. In addition, it will be obvious that the various readings taken from the indicators may be combined either within the instrument or externally in order to provide a direct classification or measurement for the various blocked or open values of the vane element.

The preferred data for initially positioning the vane element include four datum points and one datum line selected to accurately locate the vane element within the instrument. The single or primary datum line is taken along a base surface for one of the buttresses, one of the datum points being a single point along the base surface for the other buttress. Two additional datum points are taken along a common lateral surface of each buttress in order to establish the lateral position of the vane element generally along the path of airflow through the vane assembly. The other datum point is taken at one end of the vane or airfoil element to permit an accurate determination of the effective length for the vane.

The values determined by the various indicators are summarized below and it is again noted that different combinations of these values may be employed for classifying the vanes for different purposes. Values provided by the indicators include the location of the trailing edge of the vane relative to the various datum points and lines. Preferably, the location of the trailing edge is measured both as to its lateral position upon the buttresses and relative to the base surface of the buttresses in order to provide another value hereinafter referred to as "crop dimension". The lateral position of the trailing edge for the vane is necessary to determine displacement of the vane upon the buttresses for calculating both blocked area and open flow area.

Another indicator is provided with a number of contact points for accurately locating a convex airfoil surface portion of the vane along its length. Preferably, a second similar indicator is provided for similarly locating the convex airfoil surface of a second vane element adjacent the first vane element in order to better calculate the open flow area for the combination.

Two additional indicators determine the effective width for the two buttresses. These values are of course important since the effective widths of the buttresses for adjacent vane elements cooperate to establish the spacing between the vanes.

Yet another indicator is employed to measure the effective length of the vanes. Finally, an indicator is employed to determine buttress twist. In this regard, it may be noted above that a primary datum was taken along a base surface of one buttress with another datum point being taken upon the other buttress. Accordingly, the buttress twist indicator senses yet another point upon the other buttress in order to provide an indication of misalignment between the buttresses which will result in relative twisting of the buttresses when they are mounted in place in a vane assembly.

The various indicators referred to above thus provide a number of values which may be simply illustrated on a linear scale. Those values from the various indicators may then be employed in various calculation for determining different types of classification for the vane. It will also be apparent from the following description that the readouts from the various indicators could be collected for example by electronic means and transmitted to suitable computer means for automatically producing the various classification values. However, such a computer function is set forth merely as an example of one means for employing the indicator values from the present classification instrument and is not described in greater detail below.

Additional objects and advantages of the present classification instrument and method for classifying a vane element will be apparent from the following description having reference to the accompanying drawings.

DESCRIPTION OF THE PREFERRED EMBODIMENT

The classification instrument of the present invention is indicated at 10 in the various drawings, particularly in FIGS. 1-3, and includes a fabricated housing 12 including various components for initially mounting a vane element thereupon relative to a number of selected datum points or lines as described below and additional indicating means for measuring various surfaces upon the vane element. An airfoil or vane element of the type to be classified by the present classification instrument is indicated at 14 in FIG. 9. In the following description, portion of the instrument 10 for initially positioning the vane element 14 in place in accordance with the various datum points and lines are first described followed by a description of the various instruments for measuring selected surfaces of the vane element, a method for classifying such valve elements thereafter being set forth with reference to the present instrument.

Figures 4, 9:
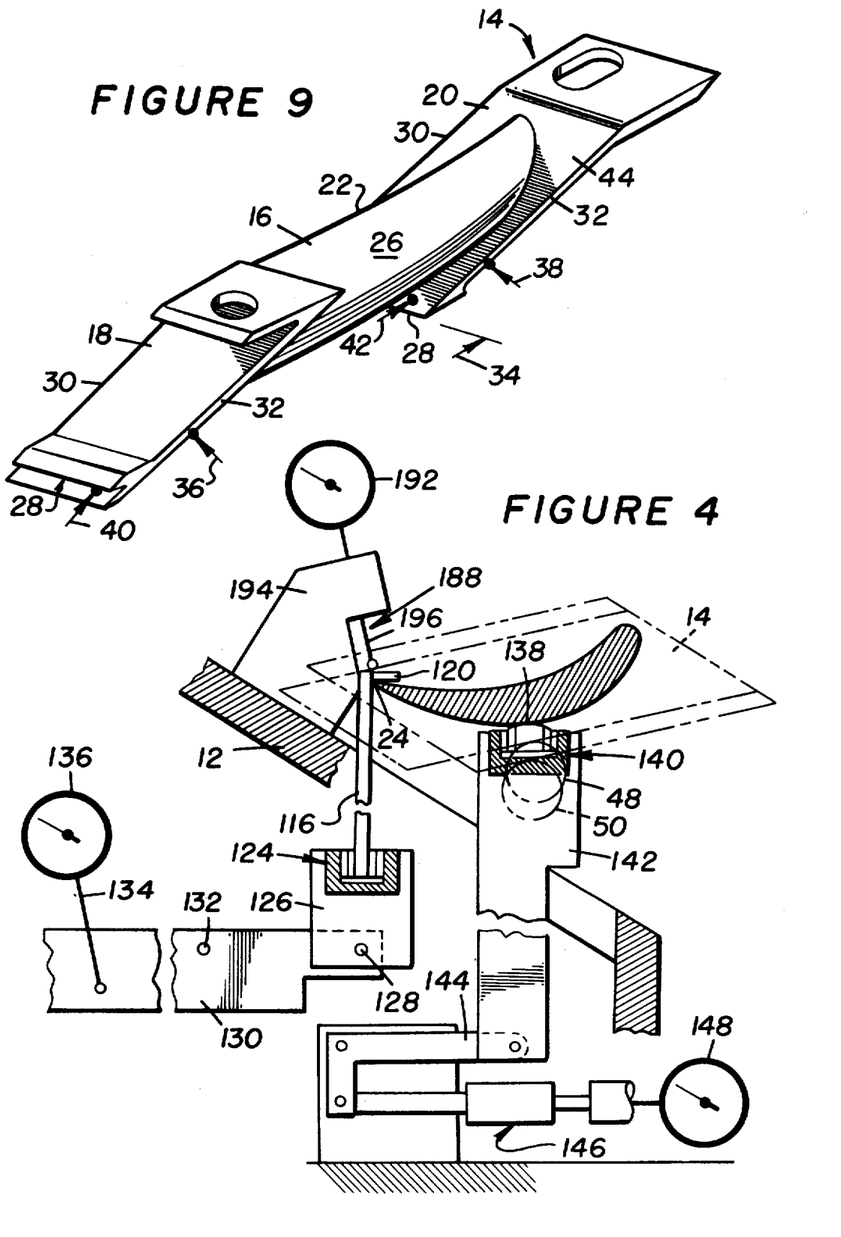
FIG. 4 is a fragmentary, partially schematic representation of portions of the classification instrument to better illustrate their interaction with a vane element to be classified by the instrument.
FIG. 9 is a representation of an airfoil or vane element of the type to be classified by the present invention with the various datum points and lines contemplated by the present invention being illustrated thereupon.

Referring momentarily to FIG. 9, the preferred datum points and lines by which the vane element 14 is positioned upon the classification instrument 10 are indicated by arrows as described below. The vane element 14 is of generally conventional construction including an airfoil or vane 16 having integrally formed buttresses 18 and 20 at opposite ends thereof. The vane 16 includes a leading edge 22, a trailing edge 24 as may be better seen for example in FIG. 4, and a convex airfoil surface generally indicated at 26. Each of the buttresses 18 and 20 include a base surface 28 which engages a portion of an assembly for receiving and positioning the vane element 14 in a vane cluster or array. Each of the buttresses 18 and 20 also includes lateral surfaces 30 and 32 which engage lateral surfaces of adjacent vane elements, the spacing between the lateral surfaces 30 and 32 thereby serving to partially establish the open flow area between adjacent vanes 16.

A primary datum line is indicated by the arrow 34 for parallel abutting engagement with the base surface 28 of one of the buttresses, preferably the right buttress 20. Four other datum points are established for positioning the vane upon the instrument and include second and third datum points 36 and 38 for positioning one lateral surface of each buttress. Preferably, the second datum point 36 is in abutting engagement with the lateral surface 32 for the left buttress 18 while the third datum point 38 is in abutting engagement with the lateral surface 32 for the right buttress 20. A fourth datum point is indicated by the arrow 40 for abutting point contact with the base surface 28 of the other or left buttress 18. It may thus be seen that the primary datum line 34 and the fourth datum point 40 provide a planar surface for positioning the vane element 14. The fifth datum point is indicated by an arrow 42 taken in abutting contact with a surface of one of the buttresses to permit measurement of the effective length of the airfoil or vane 16. Preferably, the fifth datum point 42 contacts an inside surface 44 of the right buttress 20 to which the airfoil 16 is attached. Of course, it should be noted that the datum surface requirements may vary for different engine models and vane constructions.

Referring now also to FIGS. 1-4, 6 and 7, the instrument 10 includes various stop surfaces for positioning the vane element 14 according to these selected datum points and lines. Initially, the primary datum line 34 for receiving the base surface 28 of the right buttress 20 is provided by a positioning plate 46 best illustrated in FIG. 6. Circular stops 48 and 50 are provided to form the second and third datum points 36 and 38 for engaging the lateral surfaces 32 of the left and right buttresses 18 and 20 respectively. The fourth datum point 40 is formed by a plate 52, which contacts a small portion of the base surface 28 of the left buttress 18. The fifth datum point 42 is provided by another plate 54 secured to the housing 12 and having a ball 56 extending from one end thereof to provide a point contact with the inside surface 44 of the right buttress 20.

Figures 6, 8:
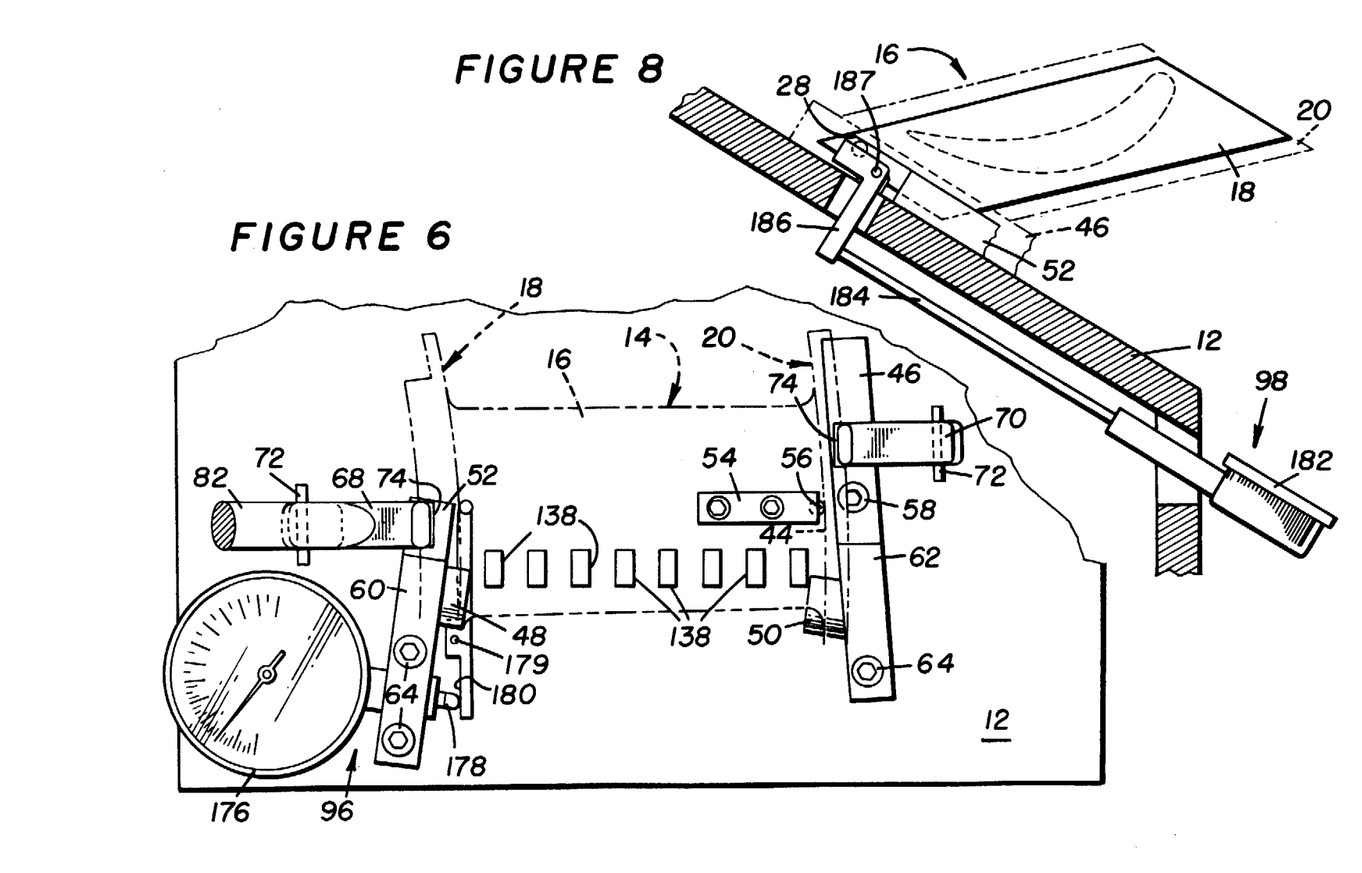
FIG. 6 is an enlarged fragmentary view of a portion of the instrument adapted to receive the vane element and an indicator for measuring effective vane length.
FIG. 8 is another fragmentary view of a portion of the classification instrument illustrating the arrangement of another indicator upon the instrument for measuring buttress twist.

Preferably, all of the stop elements comprising the positioning plate 46, the circular stops 48, 50, the inclined plate 52 and the ball 56 are formed from suitably hardened material such as carbide steel in order to maintain accurate dimensions for the datum points and lines upon the instrument during extended use. All of the various steps, referred to above, are fixed relative to the housing 12. For example, the positioning plate 46 is secured to the housing by screws such as that indicated at 58. The circular stops 48 and 50 are respectively mounted upon brackets 60 and 62 which are also secured to the housing 12 for example by screws 64. The plate 52 is similarly secured to the instrument housing 12 by screws as is the plate 54 upon which the ball 56 is mounted.

Figure 7:
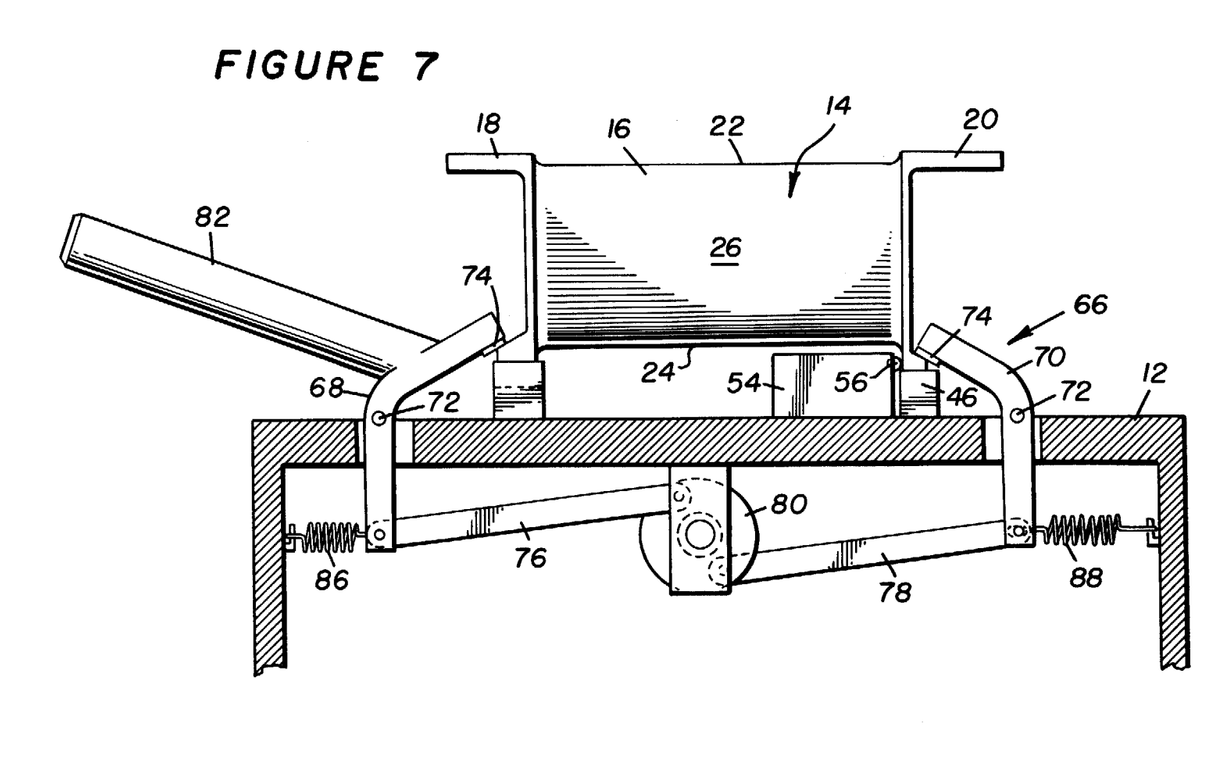
FIG. 7 is also a fragmentary representation of a portion of the instrument adapted for receiving the vane element together with a planting assembly for securing the vane element in place during classification.

The vane element 14 is secured in place upon the instrument housing in abutting engagement with the various datum stops referred to above by means of a clamping assembly 66 best illustrated in FIG. 7. The clamping assembly includes two bell crank levers 68 and 70 which are pivotally mounted upon the instrument housing 12 by pins 72. Each of the levers 68 and 70 includes a pad 74, preferably formed from a resilient material such as rubber or the like, for engaging opposite sides of the vane element 14 and urging it downwardly into engagement with the various datum stops. The lower ends of the bell-crank levers 68 and 70 are respectively connected with pivotable links 76 and 78 which are in turn pivotably interconnected through a rotatable wheel 80. A handle 82 for operating both of the levers 68 and 70 of the clamping assembly is secured to one of the levers, preferably that indicated at 68. Movement of the lever 68 is duplicated by the other lever 70 because of the arrangement of the links 76, 78 and the wheel 80. One of the pin holes in link 78 is slotted to provide some independency of movement in levers 68 and 70, to allow for vane variations at the clamped surfaces. Stabilizing springs 84 and 86 are interconnected between respective levers 68 and 70 and the housing 12. However, it may be clearly seen that by rotating the handle 82 in a clockwise direction as viewed in FIG. 7, both of the pads 74 on the levers 68 and 70 are urged downwardly against the vane element 14 to secure it in place upon the instrument and in engagement with the five datum stops. Again, it should be kept in mind that clamping means may vary depending upon vane configuration.

With the vane element 14 secured in place upon the instrument, a number of indicators are then employed to measure various surfaces of the vane element in order to provide information for determining the blocked and open flow area values referred to above. These indicators, which were also summarized above, are described immediately below together with the various components upon the instrument housing 12 for engaging the selected surfaces of the vane element 14.

Figure 5:
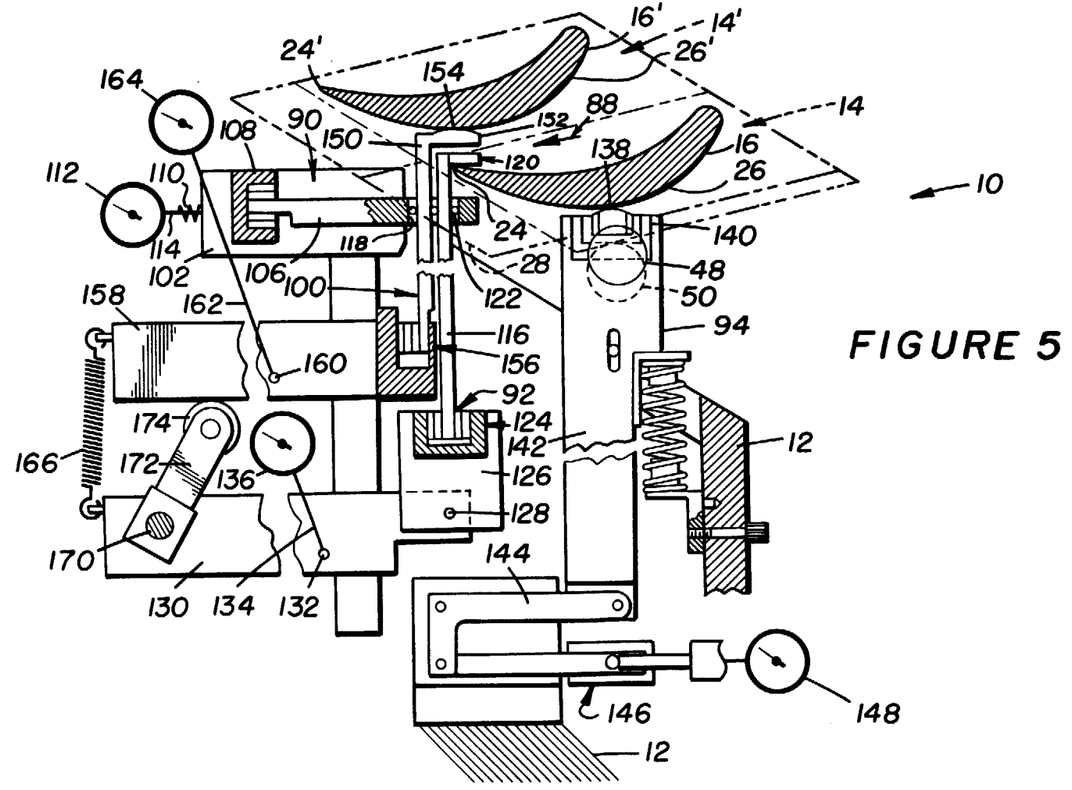
FIG. 5 is a view similar to FIG. 4 while also illustrating additional portions of the instrument for interaction with a pair of vane elements to be classified by the present instrument.

Components for a number of the indicator assemblies in the classification instrument and the surfaces of the vane element which they are adapted to measure may be best seen for example in FIG. 5 while also having reference to the other figures. Referring momentarily to FIG. 5, the classification instrument 10 is illustrated supporting the first vane element 14 together with a second vane element 14'. The two elements 14 and 14' may for example form a vane cluster of a type adapted for mounting in a radial array of vane elements such as in a stage of turbojet engine. As will be more apparent below, the present classification instrument is adapted to also provide certain measurements for the second vane element 14' in order to better assess the open flow area between the two adjacent vane elements.

In accordance with conventional practice, airflow passes between the vane elements from right to left as viewed in FIG. 5, airflow exiting the open flow area between the vanes generally parallel to the concave airfoil surface adjacent the trailing edge for the lower vane such as that indicated at 14 in FIG. 5. Accordingly, the direction of airflow past or through the vane elements 14 and 14' is generally indicated by an arrow 88. The specific location and direction of the arrow 88 is not completely accurate in accordance with aerodynamic performance of the airfoil or vane elements. However, it is merely provided to assist in understanding the orientation of the various surfaces which are measured by the present classification instrument.

Referring now particularly to FIG. 5 as well as to the other figures, the various indicators within the classification instrument 10 include a first indicator assembly generally indicated at 90 for measuring the location of the trailing edge 24 relative to the base surface 28 of the buttresses along a line generally parallel to the direction of airflow in order to provide an indication of crop dimension for each vane element.

A second related indicator assembly 92 also measures the location of the trailing edge 24 but in a direction generally perpendicular to air flows past the vane. A third indicator assembly 94 is provided as indicated in FIG. 5 for measuring the position of the convex airfoil surface 26 at a selected point along its length. Before describing the other indicator assembly illustrated in FIG. 5, attention is directed to FIG. 3 wherein a fourth indicator assembly 96 is provided for measuring effective vane length.

Similarly referring momentarily to FIG. 8, a fifth indicator assembly 98 is provided for measuring relative rotation between the opposite ends of the airfoil or vane 16 as determined by angular displacement between the base surfaces 28 of the two buttresses.

Finally, referring again to FIG. 5, yet another sixth indicator assembly 100 is provided for measuring the position of the convex airfoil surface 26' on the second airfoil element 14'. Thus, information from the sixth indicator assembly 100 taken together with information from the third indicator assembly 94 facilitates determination of the open flow area between the adjacent vanes for the two vane elements 14 and 14'. The components and manner of operation for these various indicator is described immediately below.

The first indicator assembly 90 may be best seen by combined reference to FIGS. 1-5. The indicator assembly 90 includes a movable carriage 102 supported by a number of bearings 104 to facilitate its movement within the instrument housing 12. In order to precisely measure the location of the trailing edge at a number of points along its length, a number of crop fingers 106 fixed in forwardly from the carriage toward the vane element as may be seen for example in FIGS. 2 and 5. The crop fingers are interconnected with the carriage 102 by means of an averaging linkage 108 so that the position of the carriage 102 may be accurately determined by the position of each of the crop fingers 106. In carriage 102 the crop fingers 106 are urged outwardly or in a rightward direction as viewed for example in FIGS. 2 and 5 by means of a spring 110 interacting between the carriage and the housing 12. An indicator 112 providing a linear read-out relative to the crop dimension for the trailing edge of the vane element is mounted upon the housing 12 and includes a movable plunger 114 for varying the reading of the indicator 112 depending upon the position of the carriage 102. Referring particularly to FIG. 5, the first indicator assembly 90 interacts with the vane element through components of the second indicator assembly 92 which is accordingly described immediately below.

The second indicator assembly 92 similarly includes a number of fingers 116 spaced along the length of the airfoil or vane 16. Each of the fingers 116 passes through an opening 118 in one of the corresponding crop fingers 106. The upper end of each of the fingers 116 includes an outwardly projecting pin 120, the 90° intersection between each of the fingers 116 and its pin 120 being urged against the trailing edge 24 of the vane in order to provide an indication for both the lateral position of the trailing edge upon the buttresses and the crop dimension for the trailing edge generally parallel to the direction of airflow. With the fingers 116 being urged downwardly by means of a spring force described in greater detail below and the fingers 106 being urged rightwardly as viewed for example in FIG. 5, both the fingers 116 and the pins 120 tend to be urged into intimate abutting engagement with the trailing edge 24. Since the fingers 116 are accurately located within the opening 118 of the respective fingers 106 by bearings such as that indicated at 122, the interaction of the fingers 116 and pins 120 serve to provide an average reading for the trailing edge location in both the first indicator assembly 90 and the second indicator assembly 92. To complete the description of the second indicator assembly 92, the fingers 116 are again interconnected through an averaging linkage 124 with a single carriage element 126. The carriage element 126 is pivotably connected at 128 to a lever 130 which rotates about a pivot point 132 established in the housing 12. An actuating plunger 134 is interconnected with the lever and serves to provide a linear reading upon an indicator 136 which thus responds to the position of the fingers 116 and lever 130 to provide an averaged value corresponding to the lateral position of the trailing edge 24 upon its buttresses. At the same time, the indicator 112 responds to the averaged position of the fingers 106 through the carriage 102 to provide a reading corresponding to the crop dimension for the trailing edge 24.

The third indicator assembly 94 similarly includes a plurality of eight circumferential probes 138 supported by an averaging linkage 140 for engaging the convex airfoil surface 26 of the airfoil or vane 16. The averaging linkage 140 is in turn mounted on a support bar 143 which in turn is interconnected through a bell-crank 144 with a plunger assembly 146 for producing a reading upon an indicator 148 corresponding to the average position for the convex airfoil surface along its length.

The sixth indicator assembly 100 is described next because of its interaction with the second indicator assembly 92. The indicator assembly 100, like the indicator assembly 92, includes a plurality of eight spaced apart fingers 150 which extend through the openings 118 in the crop fingers 106 and supported therein by the bearings 122. A lateral projection 152 at the upper end of each of the fingers 150 supports a rounded probe 154 for engagement with spaced apart portions of the convex airfoil surface 26' for the second vane element 14'. The fingers 150 are interconnected through an averaging linkage 156 with a lever 158 which is pivotably secured to the house 12 at 160. Another elongated plunger 162 is interconnected with the lever 158 and extends upwardly to provide a reading in an indicator 164 which is dependent upon the averaged location for the convex airfoil surface 26'.

A spring 166 is interconnected with the levers 130 and 158 and interacts therebetween to urge the fingers 150 upwardly for engagement with the convex airfoil surface of the second vane element 14' while also urging the fingers 116 downwardly in order to assure intimate engagement with the trailing edge 24 on the first vane element 14. A lever 168 (see FIG. 1) is provided for repositioning the indicator assemblies 92 and 100 in order to facilitate removal of the vane elements from the instrument as well as installation of a new vane element or cluster thereupon. For that purpose, the lever 168 is interconnected through a shaft 170, rotatably attached to the lever 130 with another lever 172 having a roller 174 mounted thereupon for engagement with the other lever 158. Thus, by rotating the lever 168, the shaft 170 and the lever 172 in a counterclockwise direction viewed for example in FIGS. 1 and 5, the fingers 150 and 116 are caused to retract from engagement with the respective airfoil elements 14' and 14 to avoid interference with movement of those elements. The lever 168 may be maintained in this position until a new vane element or cluster is mounted upon the instrument whereupon release of the lever 168 permits the spring 166 to urge the fingers for both the indicator assemblies 92 and 100 into their normal positions for measurement.

Figure 3:
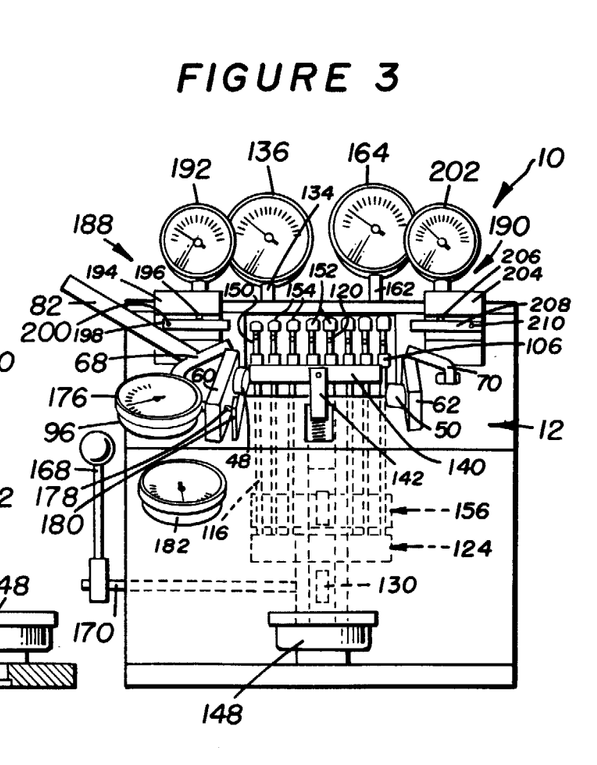
FIG. 3 is similarly a front view of the instrument with internal portions of the instrument being shown in phantom.

Referring now particularly to FIGS. 3 and 6, the fourth indicator assembly 96 includes an indicator 176 mounted upon a bracket 60 with its actuating plunger 178 extending through an opening in the bracket 60 for engaging a lever 180 pivoting upon pin 179 which engages the left buttress 18. The plunger 178 thus provides a direct reading on the indicator 176 corresponding to the effective length for the vane or airfoil 16 of the vane element 14.

Referring now to FIG. 8, the fifth indicator assembly 98 includes an indicator 182 for providing a reading proportional to relative rotation of twist between the base surfaces of the buttresses 18 and 20. Since the surfaces will be brought into alignment with support surfaces in a vane cluster or array, any misalignment between these surfaces will result in angular twist in the airfoil or vane 16 after installation. The indicator 182 includes a plunger 184 operatively interconnected with a bell-crank lever 186 rotating on pin 187 for engagement with a point upon the base surface 28 of the left buttress 18 in spaced apart relation from the fourth datum point indicated at 40 in FIG. 9. Thus, any angular displacement between the base surfaces 28 for the two buttresses produces a reading upon the indicator 182.

Figure 1:
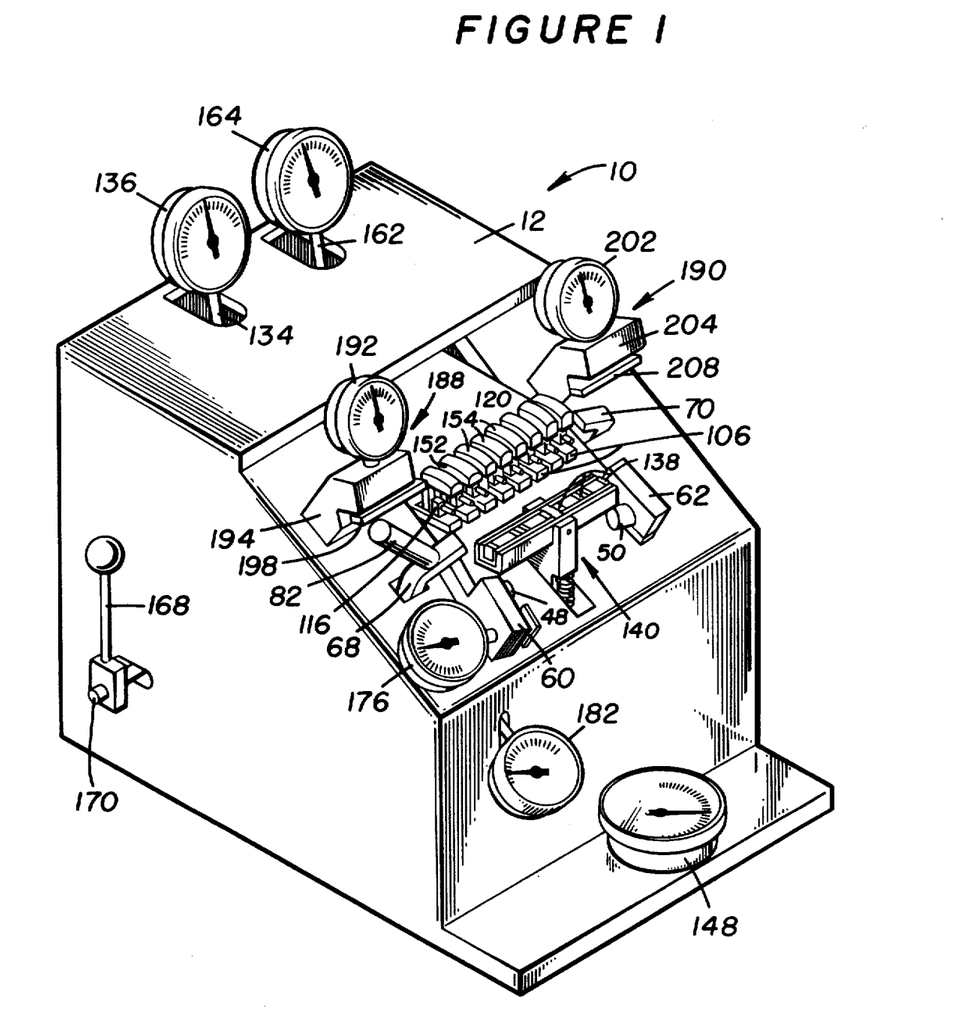
FIG. 1 is a perspective view of a classification instrument constructed according to the present invention.
Figure 2:
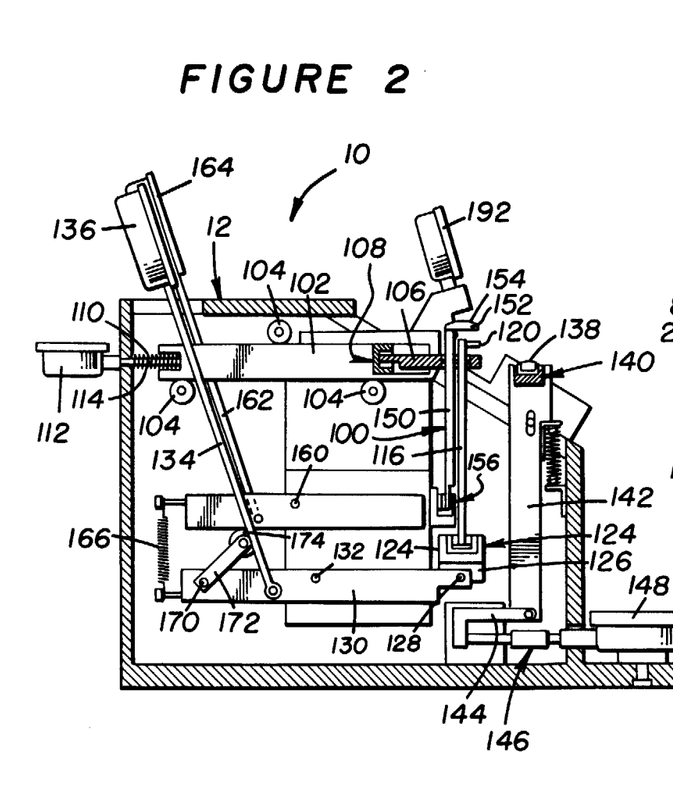
FIG. 2 is a view taken from the left side of the classification instrument with parts of the instrument being sectioned to better illustrate its internal construction.

Referring now particularly to FIG. 1, seventh and eighth indicator assemblies 188 and 190 are provided for measuring the effective width of the left and right buttresses 18 and 20. Operation of the seventh indicator assembly 188 is best illustrated in FIG. 4 and it is to be noted that the eighth indicator assembly 190 is of similar construction and operation for measuring the effective width of the right buttress 20. As may be best seen by combined reference to FIGS. 1, 3 and 4, the seventh indicator assembly 188 includes an indicator 192 which is mounted upon the housing 12 by means of a bracket 194 and includes a plunger 196 extending through an opening in the bracket 194 for engagement with a lever 198 pivotably secured at 200 to the bracket 194, its opposite end extending over the left buttress 18 for engagement with its lateral surface 30. Thus, with a vane element 14 mounted upon the instrument housing 12, the lever 198 engages the lateral surface 30 of the left buttress to provide an indication of its effective width. In this connection, it is to be noted that the left buttress is laterally positioned upon the instrument housing by the circular stop 48 in order to achieve reproducible results within the indicator 192.

At the same time, the eighth indicator assembly 190 includes a similar combination of elements for providing an indication of width for the right buttress 20. Thus, the eighth indicator assembly 190 indicator 202, supported upon a bracket 204 and having a plunger 206 interacting with a lever 208 pivotably connected to the bracket 204 at 210. With the lever 208 engaging the lateral surface 30 of the right buttress the indicator 202 provides a reading proportional to the effective width for the right buttress 20.

The components in the eighth indicator assemblies which engage various surface portions of the vane element 14 or 14' are also preferably formed from hardened material such as carbide steel in order to maintain dimensional stability.

The mode of operation for classifying a vane element or cluster within the present classifying instrument is believed to be apparent from the preceding description. However, the method for such classification is briefly described below in order to ensure complete understanding of the invention.

Initially, a vane element such as that indicated at 14 in FIG. 9 is positioned upon the instrument housing 12 and secured in place by means of the clamping assembly 66. With the vane element in place, the base surface of its right buttress 20 is in abutting engagement with the positioning plate 46. The lateral surfaces 32 of the left and right buttresses 18 and 20 are respectively in engagement with the circular stops 48 and 50 while the base surface 28 of the left buttress 18 is also in engagement with the inclines plate 52 at the datum point indicated at 40 in FIG. 9. Finally, the inside surface 44 of the right buttress 20 is maintained in engagement with the stop pin 56 as may be best seen in FIGS. 6 and 7.

With the vane element 14 thus positioned upon the instrument housing 12, the various indicator assemblies are actuated to ensure their positive contact with appropriate surface of the vane element. With a single vane element in place upon the housing 12, the sixth indicator assembly 100 would not be employed since it is only useful in connection with a vane cluster including a second vane element such as that indicated at 14' in FIG. 5.

Otherwise, with the single vane element 14 in place upon the instrument housing, components of the first and second indicator assemblies 90 and 92 interact to provide accurate readings upon their respective indicator 112 and 136 relating to the position of the trailing edge along its entire length. In this connection, it is noted that the averaging linkage referred to at 124 for the indicator assembly 92 as well as the averaging linkage referred to at 108 for the first indicator assembly 90 and the other averaging linkages referred to in the various assemblies are of similar construction and operation as described in greater detail within U.S. Pat. No. 3,464,119 referred to above.

In connection with both the first and second indicator assemblies, it will be apparent that all five datum points or lines will be useful in establishing a reference point from which values are measured by the two indicator assemblies.

At the same time, the probes 138 for the third indicator assembly 94 are in contact along the length of the convex airfoil surface 26 to provide an appropriate reading on the indicator 148. Here again, the third indicator assembly 94 may be referenced based primarily upon the lateral position of the vane element 14 as established by the two circular stops 48 and 50.

The fourth indicator assembly 96 (see FIG. 3) provides the reading upon its indicator 176 depending upon the effective length for the airfoil or vane 16 in the vane element 14. The fifth datum point 42 is of course of greatest importance as a reference for the dimension of value measured by the fourth indicator assembly.

Referring to FIG. 8, the fifth indicator assembly of course provides a reading depending upon angular misalignment between the base surfaces for the two buttresses. Thus, the first datum line for the right buttress 20 as well as the fourth datum point 40 established on the plate 52 are of particular importance as references in the fifth indicator assembly.

The seventh and eighth indicator assemblies 188 and 190 provide readings directly proportional to the widths for the buttresses 18 and 20. Accordingly, the datum points provided by the stops 48 and 50 are of particular importance as references for these two indicator assemblies.

Finally, the present classification instrument 10 may also be employed to provide direct measurement of the open flow area between a pair of airfoils or vanes such as those included in the cluster formed by the vane element 14 and second vane element 14' of FIG. 5. With such a combination, the sixth indicator assembly 100 functions to provide a reading corresponding to the position of the convex airfoil surface 24' for the second airfoil element 14'. It will be immediately apparent that information from the sixth indicator assembly 100 may be directly combined with information from the third indicator assembly 94 and the fourth indicator assembly 96 in order to provide a direct measurement for the open flow area between the airfoils or vanes 16 and 16'.

Variations and modifications for the classification instrument of the present invention will be immediately apparent from the preceding description. Accordingly, the scope of the present invention is defined only by the following appended claims.

I claim:

1. A classification instrument for accurately measuring open flow area between two vane elements having mounting buttresses at either end, comprising
   support means,
   a precision jig in said support means adapted to receive and accurately position both the first vane element and its buttresses,
   movable probes arranged upon the support means for accurately monitoring respectively the location of a trailing edge of the first vane element, the location of a convex airfoil surface of the first vane element, spacing between the buttresses as an indication of effective vane element length, and the effective thickness of the vane element,
   indicating means carried by said support means and interconnected with the respective movable probes for indicating values monitored by the movable probes, and
   a further set of movable probes for spaced apart engagement with a convex airfoil surface of the additional vane element, and indicating means being interconnected with the further set of movable probes in order to provide an indication of open flow area between the vane elements.

2. The classification instrument of claim 1 further comprising an averaging mechanism interconnecting the probes for measuring the convex airfoil surface of the additional vane element and the respective indicator.

3. The classification instrument of claim 2 further comprising separate sets of movable probes for spaced apart engagement respectively with the trailing edge of the vane element and the convex airfoil surface of the vane element, a separate averaging mechanism interconnecting each set of movable probes with the respective indicating means.

4. The classification instrument of claim 1 further comprising two sets of movable probes for engaging the trailing edge of the vane element, one set of movable probes being arranged for spaced apart engagement with the trailing edge to monitor its lateral position upon the buttresses, the other set of movable probes engaging the trailing edge in spaced apart relation to monitor its position relative to base surfaces of the buttresses in order to provide an indication of crop dimension, separate indicating means being interconnected with the respective sets of movable probes for the vane element trailing edge by separate averaging mechanisms.

5. The classification instrument of claim 4 further comprising an additional movable probe means for measuring angular misalignment of mounting means for the buttresses at opposite ends of the vane element and additional indicating means interconnected with said additional probe means for indicating a value corresponding to the amount of angular misalignment.

6. The classification instrument of claim 5 wherein the additional probe means is arranged for measuring angular misalignment between mounting base surfaces of the two buttresses.

7. The classification instrument of claim 1 further comprising an additional movable probe means for measuring angular misalignment of mounting means for the buttresses at opposite ends of the vane element and additional indicating means interconnected with said additional probe means for indicating a value corresponding to the amount of angular misalignment.

8. The classification instrument of claim 7 further comprising a clamping mechanism mounted on the support means for urging the vane element and its buttresses into precise engagement with stop means forming part of the precision jig.

9. A classification instrument for measuring both blocked area and effective open area of a single vane element including mounting buttresses arranged at opposite ends thereof, each buttress having a base surface by which it is secured to a support surface for a vane cluster, the instrument comprising > stop means for engaging four datum points and one primary datum line formed by the vane element and its supporting buttresses, the primary datum line being formed by the base surface of one of the buttresses, a first datum point being a single point along the base surface of the other buttress being representative of angular alignment for the base surfaces of the two buttresses, the second and third datum points being taken along a common lateral surface of each buttress in order to establish the lateral position of the vane element generally along a path of airflow through the vane assembly, the fourth datum point being formed at one end of the vane element and being representative of the effective length of the vane element,
>
> clamping means for maintaining the vane element and its buttresses in engagement with said stop means,
>
> movable probes arranged upon the support means for accurately monitoring respectively the location of a convex airfoil surface of the vane element, spacing between the buttresses as an indication of effective vane element length, effective thickness of the vane element, and angular misalignment of the base surfaces of the buttresses, and
>
> indicating means carried by said support means and interconnected with the respective movable probes for indicating values monitored by the movable probes.

10. The classification instrument of claim 9 further comprising separate sets of movable probes for spaced apart engagement respectively with the trailing edge of the vane element and the convex airfoil surface of the vane element, a separate averaging mechanism interconnecting each set of movable probes with the respective indicating means.

11. The classification instrument of claim 10 further comprising two sets of movable probes for engaging the trailing edge of the vane element, one set of movable probes being arranged for spaced apart engagement with the trailing edge to monitor its lateral position upon the buttresses, the other set of movable probes engaging the trailing edge in spaced apart relation to monitor its position relative to base surfaces of the buttresses in order to provide an indication of crop dimension, separate indicating means being interconnected with the respective sets of movable probes by separate averaging mechanisms.

12. The classification instrument of claim 9 further comprising two sets of movable probes for engaging the trailing edge of the vane element, one set of movable probes being arranged for spaced apart engagement with the trailing edge to monitor its lateral position upon the buttresses, the other set of movable probes engaging the trailing edge in spaced apart relation to monitor its position relative to base surfaces of the buttresses in order to provide an indication of crop dimension, separate indicating means being interconnected with the respective sets of movable probes by separate averaging mechanisms.

13. The classification instrument of claim 9 adapted to receive a vane assembly including an additional vane element and further comprising a further set of movable probes for spaced apart engagement with a convex airfoil surface of the additional vane element, indicating means being interconnected with the further set of movable probes in order to provide an indication of open flow area between the vane elements and the vane assembly.

14. The classification instrument of claim 13 further comprising an averaging mechanism interconnecting the probes for measuring the convex airfoil surface of the additional vane element and the respective indicator.

15. In a method for accurately measuring both blocked area and effective open area for a single vane element having mounting buttresses at either end, the steps comprising > accurately positioning the vane element and its buttresses in a precision jig formed by suitable support means,
>
> accurately monitoring respectively the location of a trailing edge of the vane element, the location of a convex airfoil surface of the vane element, spacing between the buttresses as an indication of effective vane element length, and the effective thickness of the vane element by means of movable probes arranged upon the support means for engagement with selected portions of the vane element and its buttresses,
>
> providing an indication of values monitored by the movable probe by means of indicating means carried by said support means and interconnected with the respective movable probes, and
>
> arranging stop means upon the support means for engaging four datum points and one primary datum line formed by the vane element and its supporting buttresses, the primary datum line being formed by the base surface of one of the buttresses, a first datum point being a single point along the base surface of the other buttress being representative of angular alignment for the base surfaces of the two buttresses, the second and third datum points being taken along a common lateral surface of each buttress in order to establish the lateral position of the vane element generally along the path of airflow through the vane assembly, the fourth datum point being formed at one end of the vane element and being representative of the effective length of the vane element, and clamping the vane element and its buttresses in engagement with said stop means during measurement of the blocked area and effective open area for the vane element.

16. The method of claim 15 further comprising the steps of monitoring angular misalignment of mounting means for the buttresses by means of an additional movable probe arranged upon the support means and providing a value corresponding to the amount of angular misalignment by means of an additional indicating means interconnected with said additional probe means.

17. The method of claim 15 further comprising the step of monitoring both the lateral position of the vane element trailing edge upon the buttresses and the position of the trailing edge relative to base surfaces of the buttresses by means of separate movable probes and providing an indication of values monitored by the separate probes in order to provide an indication of crop dimension.

18. The method of claim 15 further comprising the step of employing a vane assembly including an additional vane element and monitoring the location of the convex airfoil surface of the additional vane element in order to provide an indication of open flow area between the vane elements in the vane assembly.

* * * * *